(12) United States Patent
Stener

(10) Patent No.: US 6,690,650 B1
(45) Date of Patent: Feb. 10, 2004

(54) ARRANGEMENT IN A NETWORK REPEATER FOR MONITORING LINK INTEGRITY BY MONITORING SYMBOL ERRORS ACROSS MULTIPLE DETECTION INTERVALS

(75) Inventor: Rudolph Stener, Los Altos, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/256,780

(22) Filed: Feb. 24, 1999

Related U.S. Application Data

(60) Provisional application No. 60/076,360, filed on Feb. 27, 1998.

(51) Int. Cl.$^7$ ................................................ H04J 1/16
(52) U.S. Cl. ........................................ 370/241; 370/465
(58) Field of Search .......................... 370/254, 252, 370/241, 248, 251, 247, 245, 246, 243, 296, 297, 293, 279, 465, 466, 310, 333, 332, 338, 441, 342, 232, 468; 455/67.1, 421, 450, 452, 453, 507, 517, 524; 375/130, 134, 140, 225, 226, 227, 367, 240, 211, 213, 284, 285; 714/710, 751, 752, 754

(56) References Cited

U.S. PATENT DOCUMENTS

| | | | |
|---|---|---|---|
| 4,710,925 A | | 12/1987 | Negi |
| 5,396,495 A | * | 3/1995 | Moorwood et al. .......... 370/438 |
| 5,442,625 A | * | 8/1995 | Gitlin et al. ................ 370/342 |
| 5,488,609 A | * | 1/1996 | Hluchyj et al. ............. 370/468 |
| 5,491,687 A | | 2/1996 | Christensen et al. |
| 5,541,957 A | | 7/1996 | Lau |
| 5,857,147 A | * | 1/1999 | Gardner et al. ............. 370/468 |

FOREIGN PATENT DOCUMENTS

| | | |
|---|---|---|
| EP | 0334510 | 9/1989 |
| WO | WO97/29573 | 8/1997 |

* cited by examiner

*Primary Examiner*—Dang Ton

(57) ABSTRACT

A network repeater having a plurality of repeater ports selectively establishes links with remote nodes at one of two data rates based on the capabilities of the remote network node and a determined link integrity. A network repeater establishes a link with a network node using auto-negotiation techniques to establish a 100 Mb/s link. The network repeater than monitors the link for symbol errors, and determines an integrity of the link based on a detected number of symbol errors relative to a prescribed threshold in a dual-counter configuration. If the detected number of symbol errors counted by the first counter reaches a first threshold within a first number of received symbols, the second counter is incremented and the first counter reset. If over a second, longer interval the second counter reaches a second threshold, indicating repeated symbol errors over a greater distribution of received symbols, the network repeater performs a down shifting operation by breaking the established 100 Mb/s link, and restarting auto-negotiation to establish a 10 Mb/s link. Hence, the network repeater may monitor high-speed links for link integrity, and selectively downshift a link encountering a substantial number of errors to a reduced data rate, without a necessity of a network manager or other remote management agent.

16 Claims, 2 Drawing Sheets

ARRANGEMENT IN A NETWORK REPEATER FOR MONITORING LINK INTEGRITY BY MONITORING SYMBOL ERRORS ACROSS MULTIPLE DETECTION INTERVALS

CROSS REFERENCE TO RELATED APPLICATIONS

This application claims priority from copending Provisional Application No. 60/076,360, filed Feb. 27, 1998.

BACKGROUND OF THE INVENTION

1. Field of the Invention

The present invention relates to network repeaters, more specifically to units incorporating two or more IEEE 802.3 compliant repeaters each operating at different data rates. The principle of monitoring link integrity and adjusting operating speed to minimize error rate may also be applied to other networking equipment, including Bridges, Routers, Network interfaces and switches.

2. Background Art

Network repeaters are typically used to connect between network nodes, for example network stations serving as data terminal equipment (DTE) on different network media. Repeaters provide the advantage of extending the physical distance between network nodes by receiving a data packet from one network medium, reconditioning the physical signal, and outputting the data packet to a second network medium. The repeater may also forward carrier sense and collision signals, effectively extending the collision domain of one medium onto the second medium.

Repeaters interconnecting network nodes on different network media have conventionally been configured to connect only networks operating at the same transmission rate. One problem encountered in higher-speed networks, for example 100 Mb/s IEEE 802.3 networks, is the identification of a link, between the network repeater and a remote network node on one of the network repeater ports, having a poor level of integrity. In particular, there is a need to discover links between a repeater port and a network node that are not performing up to specifications, for example due to a poor cable connection or condition, a faulty network interface device at the remote node, etc.

One proposal for handling link failure is by using network management capabilities, for example, a remote management function (i.e., network manager) configured for monitoring and controlling operations of the repeater and the network nodes. For example, a remote management technique may use a management protocol to transmit management information between the repeater and the network manager. However, such an arrangement necessarily relies on a management function, and hence is inapplicable in unmanaged network. Moreover, the monitoring of links by a centralized network manager requires that each unit to be managed must incorporate a function to handle the management protocol (an agent), thereby increasing the complexity and processing requirements of the managed unit, e.g., a repeater.

SUMMARY OF THE INVENTION

There is a need for an arrangement for interconnection of different speed network nodes using a repeaters, where the link integrity between a repeater and the network nodes can be reliably monitored without the necessity of a network manager.

There is also a need for an arrangement in a network having a repeater for monitoring the link status of high speed data links, and automatically changing a selected high speed data link to a slower data rate based on detection of a marginal or unacceptable link status on the selected high speed data link.

There is also a need for an arrangement in a network repeater for monitoring the link status of high speed data links, where the error rate of a link can be reliably determined despite the presence of transient errors that may otherwise create the perception of an artificially high error rate.

These and other needs are obtained by the present invention, where a network repeater monitors each repeater port link in communication with a remote network node at a corresponding data rate. The network repeater monitors each link by counting in a first counter a detected number of symbol errors within a first interval. A second counter may also be used for increased accuracy in detecting a symbol error rate. In such cases, the second counter is incremented if the detected number of symbol errors exceeds a first threshold within the first interval. If the second counter reaches a second threshold within a second interval, substantially longer than the first interval, then the link integrity is deemed to have an unacceptably high error.

According to one aspect of the present invention, a method in a network repeater includes establishing a link with a remote network node at a prescribed rate via a network medium, and determining an integrity of the link. The integrity of the link is determined by counting in a first counter a detected number of symbol errors within a first interval, incrementing a second counter if the detected number of symbol errors exceeds a first threshold within the first interval, and determining if the second counter reaches a second threshold within a second interval including a successive plurality of the first intervals, the link integrity based on the second counter reaching the second threshold within the second interval. Use of the first and second counters enables the monitoring of symbol errors to be more evenly distributed, minimizing the possibility of transient symbol errors generating an artificially high symbol error rate.

An additional feature of this aspect includes selectively reducing the data rate on the network medium to a reduced data rate in response to the number of symbol errors exceeding prescribed threshold. Hence the network repeater, upon detecting that the number of symbol errors exceeds the prescribed threshold, may reduce the data rate on the identified link in an effort to provide a more reliable link that has a reduced number of symbol errors occurring relative to the link having the higher data rate.

Another aspect of the present invention provides a network repeater having a plurality of repeater ports, configured for sending and receiving data packets between remote nodes via respective network media. The network repeater includes a first repeater core configured for sending and receiving data packets between a first group of the repeater ports according to a first data rate, and a second repeater core configured for sending and receiving data packets between a second group of the repeater ports according to a second data rate slower than the first data rate. An auto-negotiation unit is configured for selecting one of the first and second data rates for establishment of links between the repeater ports and the respective remote nodes via the respective network media. A symbol error detector is configured for detecting a number of symbol errors on at least one of the links operating at the first data rate. The symbol error detector includes a first counter for counting a detected number of symbol errors within a first interval, and a second counter for counting, within a second interval larger than the first interval, a number of the first intervals having the detected number of symbol errors exceeding a first prescribed threshold. A controller detects an integrity of at least the one link based on the counter value of the second counter reaching a second threshold within the second interval. The symbol error detector can detect the number of symbol errors on at least one link, enabling monitoring of each link without the necessity of an external management function. Moreover, the use of the first and second counters ensures that the symbol error detector does not erroneously determine a poor link integrity merely due to a presence of transient errors within one or two of the first detection intervals. The controller thus enables the link to be reduced to a lower speed in the event that a higher number of symbol errors are detected over a plurality of the first intervals, indicating a higher incidence of symbol errors over a greater distribution.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference number designations represent like elements throughout and wherein.

BEST MODE FOR CARRYING OUT THE INVENTION

Figure 1:
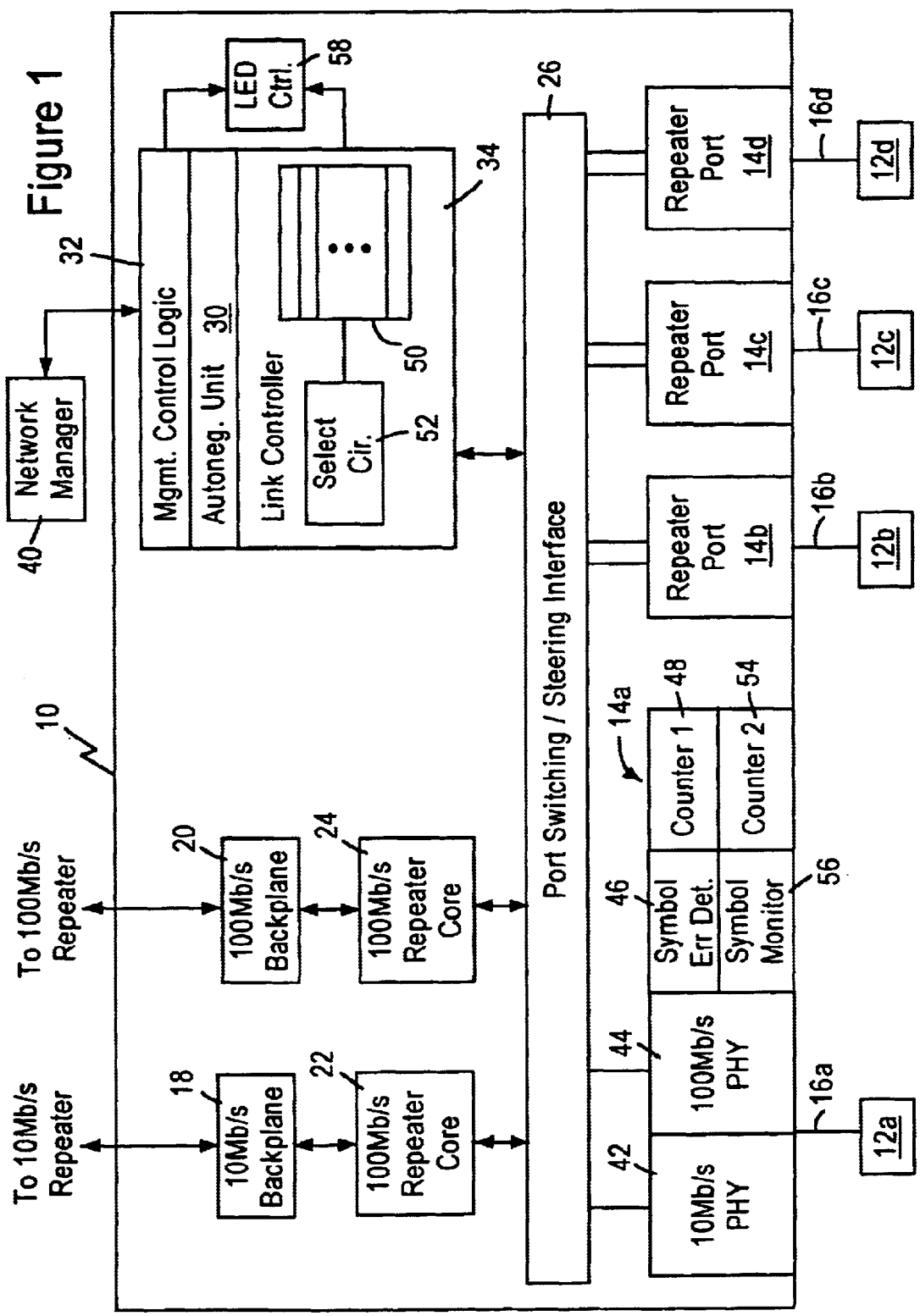
FIG. 1 is a block diagram of a network repeater according to an embodiment of the present invention.

FIG. 1 is a block diagram of a network repeater 10 configured for transmitting data packets between remote network nodes 12 according to an embodiment of the present invention. The repeater 10 is a fully integrated multiple port repeater that can operate at both 10 Mb/s and 100 Mb/s. In particular, the repeater 10 includes four repeater ports 14 that transmit and receive data packets with the respective remote network nodes 12 according to IEEE 802.3 protocol. Each repeater port 14 establishes a link with the corresponding network node 12 at a prescribed data rate (e.g., 10 Mb/s or 100 Mb/s) via a network medium 16, for example category 3 unshielded twisted pair (UTP) or category 5 UTP cable. As described below, each repeater port 14 automatically configures to the speed of the remote network nodes 12 using negotiation protocols. As recognized in the art, the 10-BASE-T protocol specifies transmitting Ethernet (IEEE 802.3) data packets at 10 Mb/s over twisted pair of UTP wiring, where the maximum cable segment distance is 100 meters from the node 12 to the repeater 10. The 100 BASE-TX standard specifies transmission of Ethernet (IEEE 802.3) data packets at 100 Mb/s over two pairs of category 5 UTP wiring, where the maximum cable segment distance is 100 meters from the node 12 to the repeater 10.

As described below, the repeater 10 also includes a 10 Mb/s back plane 18 and a 100 Mb/s back plane 20, enabling the repeater 10 to be connected to other similar repeaters, effectively forming a large port-count repeater.

The repeater 10 also includes a 10 Mb/s repeater core 22 and a 100 Mb/s repeater core 24. The repeater cores 22 and 24 are configured for sending and receiving data packets between selected repeater ports according to the respective data rates. In particular, the repeater 10 includes a port switching and steering interface 26 configured for selectively connecting each network port 14 to one of the repeater cores 22 or 24 based on the corresponding link speed of the repeater port 14. For example, if the repeater port 14a is configured for sending and receiving data packets via medium 16a at the link speed of 10 Mb/s, the port switching and steering interface 26 connects the repeater port 14a to the repeater core 22. Similarly, if the repeater port 14b is configured for sending and receiving data packets on the medium 16b at the link speed of 100 Mb/s, the port switching and steering interface 26 connects the repeater port 14b to the 100 Mb/s repeater core 24. The port switching and steering interface 26 may be implemented as a plurality of multiplexers that selectively connect each port 14 to the appropriate repeater core 22 or 24 depending on the determined link speed for the corresponding repeater port 14.

The repeater cores 22 and 24 are implemented as state machines configured for operation compliant with IEEE 802.3 Section 9 and Section 27, respectively. In particular, the 10 Mb/s repeater state machine 22 is configured such that all repeater ports 14a operating in the 10 Mb/s collision domain, within the repeater 10 or via a 10 Mb/s expansion bus coupled to the back plane 18, form a single repeater that is compliant with IEEE 802.3 Section 9. If any single port 14 connected to the 10 Mb/s repeater state machine 22 senses the start of a valid packet, the repeater core 22 will retransmit the received packet on all the other ports connected to the core 22 unless a collision is detected. The repeater core 22 also supplies the packet to the 10 Mb/s expansion bus coupled to the backplane 18 to facilitate designs using multiple repeaters 10. When retransmitting a packet, the repeater core 22 ensures that the outgoing packets comply with IEEE 802.3 signal amplitude, symmetry, and jitter requirements based on a clock that is internal to the repeater 10. In addition, the repeater core 22 will ensure that the preamble will have a minimum of 56 bits before the start of frame delimiter (SFD).

The repeater core 22 also detects and responds to collision conditions on all ports connected to the repeater core 22 as specified in IEEE 802.3, Section 9, including collision conditions detected via the back plane 18.

Other recognized functions are performed by the repeater core 22 to ensure reliable transfer of data in the 10 Mb/s collision domain for example fragment extension and auto-partition/recognition.

The 100 Mb/s repeater core 24 is implemented as a state machine configured such that all ports operating in the 100 Mb/s collision domain in the repeater 10, or via the 100 Mb/s backplane 20, form a single repeater that is compliant with IEEE 802.3u Section 27. In particular, if any port 14 connected to the 100 Mb/s core 24 senses the start of a valid packet, the repeater core 24 will transmit the received packet on all the other connected ports unless a collision is detected. The repeated data is also supplied to the backplane 20 for transmission to other repeaters connected to the backplane 20. As described above, the 100 Mb/s repeater core 24 ensures that the outgoing packet on a transmit port complies with the IEEE 802.3u (Sections 24, 25 and 27) signal amplitude, symmetry, and jitter requirements. The transmitted signal is also retimed by an internal clock. Other recognized functions are performed by the repeater core 24 to ensure reliable transfer of data in the 100 Mb/s collision domain.

The repeater 10 also includes an auto-negotiation unit 30, management control logic 32, and a link controller 34. The auto-negotiation unit 30 performs auto-negotiation as defined in IEEE 802.3 Section 28. The auto-negotiation unit 30 uses auto-negotiation protocol to establish a link between each repeater port 14 in the corresponding node 12 according to a selected data rate based upon the capabilities of the corresponding node 12. For example, if the remote node 12a is capable of transmitting at 100 Mb/s, the auto-negotiation unit 30 establishes the link between the repeater port 14a and the remote network node 12a at a 100 Mb/s data rate (100 BASE-TX). However, if the remote node 12a is not able to send and receive data packets at 100 Mb/s, the auto-negotiation unit 30 establishes the link between the repeater port 14a and remote node 12a via the network medium 16a at 10 Mb/s (10 BASE-T). In particular, the auto-negotiation unit 30 uses a burst of link pulses referred to as fast link pulses (FLPs), that are spaced between 55 microseconds and 100–140 microseconds so as to be ignored by a standard 10 BASE-T receiver. The FLP burst contains information about the capabilities of the transmitting device namely the repeater port 14. The remote network node 12 capable of 100 Mb/s transmission and reception decodes the FLP burst to learn about the capabilities of the transmitting device 14.

The repeater 10 also includes management control logic 32 that provides an interface to a processor 40 acting as a network manager. The management control logic 32 allows the network manager 40 to perform indirect access of the control registers within the network repeater 10, configured in accordance with IEEE 802.3u Section 22.

The link controller 34 is configured for selectively changing the established links between the repeater ports 14 and the remote network nodes 12 from the 100 Mb/s data rate to the 10 Mb/s data rate based on a detected reduction in the link integrity. Specifically, the link controller 34 is configured for detecting and correcting for excessive error rate in the 100 Mb/s links, for example due to faulty cabling or equipment. The integrity of the link each 100 Mb/s link is determined by performing a high-speed link integrity check on each 100 Mb/s link. Specifically, each repeater port 14 includes a 10 Mb/s physical layer transceiver 42, a 100 Mb/s physical layer transceiver 44, plus a symbol error detector 46, a first counter 48, a second counter 54, and a symbol monitor 56. The symbol error detector 46 is configured for detecting a number of symbol errors on the corresponding link when the repeater port 14 uses the 100 Mb/s transceiver 44 operating at the 100 Mb/s data rate. The counter 48 may be configured for incrementing a counter value in response to each of the detected symbol errors from the PHY 44 within a first interval. Note that a single symbol monitor 56 may alternatively be used to monitor symbol errors on all ports 14, eliminating duplicate circuitry.

As described below, the link controller 34 monitors the integrity of the link based on the presence of symbol errors detected by the second counter 54 distributed over a successive number of primary detection intervals. In particular, the first counter 48 counts a detected number of symbol errors within a first interval that corresponds to a first prescribed number of received symbols as detected by the symbol monitor 56. The value of the counter 48 is compared to a first threshold to determine if a first error rate has been reached within the first interval. The single counter 48 may be used for monitoring link integrity if simplicity is preferred. In such a case, an up/down counter is used as an error rate counter that increments in response to each detected symbol error and decrements if no errors are detected for an interval corresponding to the first interval (i.e., if the prescribed number of symbols are error free).

If resistance to transient symbol errors is preferred, the second counter 34 is used in combination with the first counter 48. The second counter 54 is incremented during each of the first intervals where the detected number of symbol errors in counter 48 equals or exceeds a first threshold. Hence, the second counter 54 counts the number of first intervals that have the detected number of symbol errors exceeding the first prescribed threshold. If the link controller 34 determines that the value of the second counter 54 exceeds a second threshold within a second interval defined by a number of received symbols substantially greater than the first interval, then the link controller 34 determines that the link encounters an unacceptably high error rate. As described below, the counters 48 and 54 are reset by the symbol monitor 56, which monitors the number of received symbols, such that a first number of symbols define a first interval for the first counter 48, and a second number of received symbols define a second interval for the second counter 54.

As shown in FIG. 1, the link controller 34 includes a table 50 and a selector circuit 52. The table 50 stores a plurality of available thresholds for each of the counters 48 and 54, and the selector circuit 52 selects two of the available thresholds for the first and second thresholds corresponding to unacceptable symbol error rates within respective first and second detection intervals based on a selection signal from the management control logic 32 or by some other means allowing a threshold to be selected in a system without management. Hence, the repeater 10 may be initially programmed with a plurality of thresholds stored in table 50, and a configuration register may also be programmed for selecting one of the thresholds, as well as the selected enabling of the downshift operation on a per-port basis.

Figure 2:
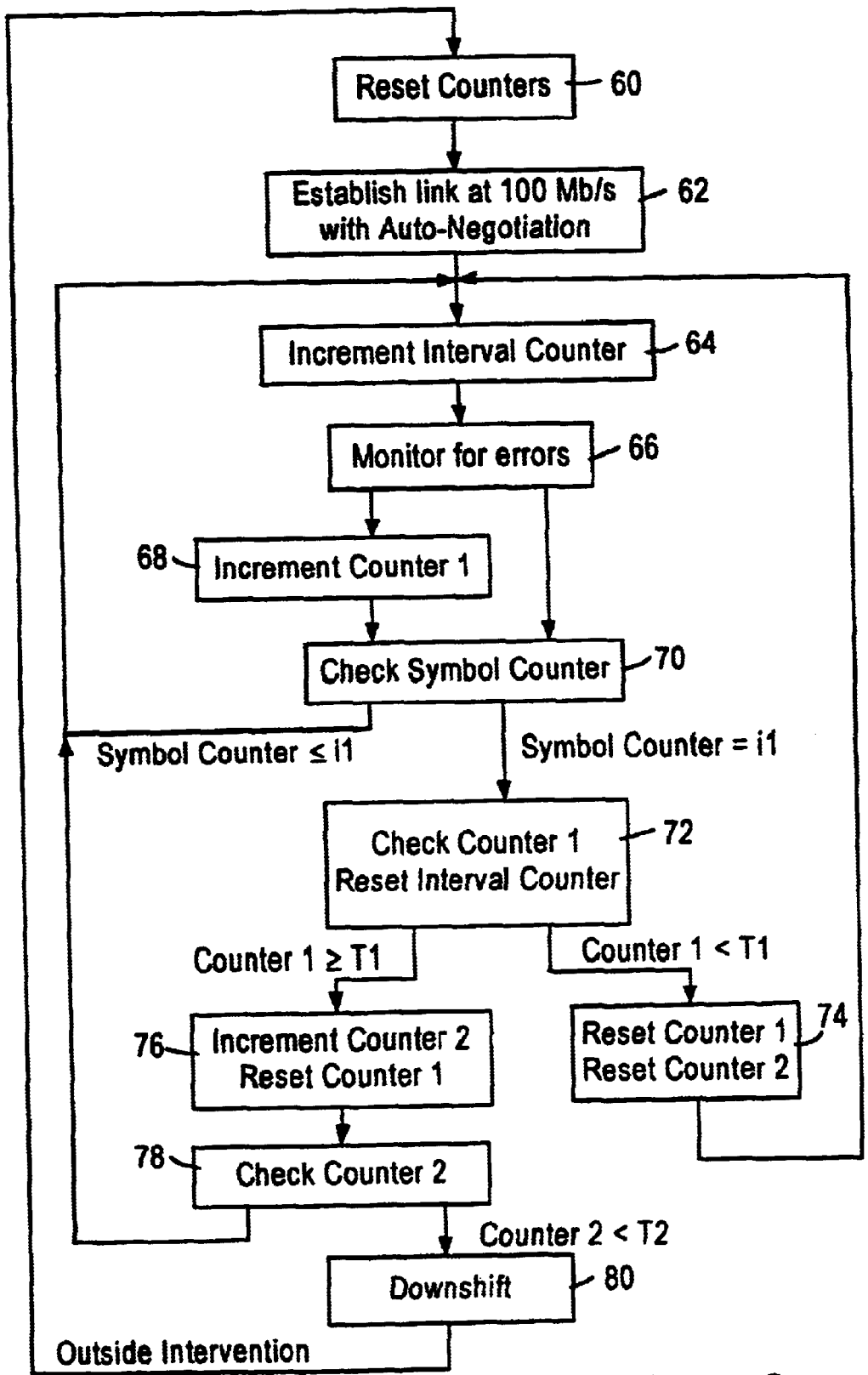
FIG. 2 is a flow diagram illustrating the method in the network repeater of controlling transmissions according to an embodiment of the present invention.

FIG. 2 is a diagram illustrating a method for controlling transmission by monitoring link integrity and selectively reducing the data transmission rate on a repeater port 14 having a link with a detected number of symbol errors reaching a prescribed threshold. FIG. 2 only illustrates the process for one port. In any multiport repeater such as the one shown in FIG. 1 each port will have its own set of processes, and all processes will run simultaneously. The methods begin in step 60, where the counters 48 and 54 in each of the repeater ports 14 are reset to zero. The auto-negotiation unit 30 then initiates a link start up procedure in step 62 every time a link to a station 12 is connected, powered on or reset by a hard reset, or following down shifting as described below with respect to step 82. Assuming that at least one network port 14 (e.g., 14a) has a link established at 100 Mb/s, the corresponding timer 54 is started in step 62.

The symbol error detector 46 begins to monitor the corresponding link (erg., 16a) in step 64. Any coded symbols not matching one of the symbols in Table I are detected as a symbol error.

TABLE 1

Symbol Definitions

| Symbol (HEX) | NRZ | 4b/5b | Interpretation |
|---|---|---|---|
| 0 | 0000 | 11110 | Data 0 |
| 1 | 0001 | 01001 | Data 1 |
| 2 | 0010 | 10100 | Data 2 |
| 3 | 0011 | 10101 | Data 3 |
| 4 | 0100 | 01010 | Data 4 |
| 5 | 0101 | 01011 | Data 5 |
| 6 | 0110 | 01110 | Data 6 |
| 7 | 0111 | 01111 | Data 7 |
| 8 | 1000 | 10010 | Data 8 |
| 9 | 1001 | 10011 | Data 9 |
| A | 1010 | 10110 | Data A |
| B | 1011 | 10111 | Data B |
| C | 1100 | 11010 | Data C |
| D | 1101 | 11011 | Data D |
| E | 1110 | 11100 | Data E |
| F | 1111 | 11101 | Data F |
| Idle | Undefined | 11111 | Idle Symbol |
| J | 0101 | 11000 | Start of Stream Delimiter: 1 of 2 |
| K | 0101 | 10001 | Start of Stream Delimiter: 2 of 2 |
| T | Undefined | 01101 | End of Stream Delimiter: 1 of 2 |
| R | Undefined | 00111 | End of Stream Delimiter: 2 of 2 |

A False Carrier (Data Stream not beginning with/J/K/) is detected as a symbol error. Any data stream that does not transition into Idle with/T/R/I/is detected as a symbol error.

The Symbol Counter 56 is set for a threshold i1 and the Symbol Error Counter 1 (48) is set to a threshold T1. The ratio of T1 to i1 corresponds to the selected error rate. For example, if the selected error rate is $10^8$ (1 error every $10^8$ data bits), i1 is set to $25*10^7$ and T1 is set to 1. This allows for a ratio of 1 symbol for every 4-decoded data bits. If T1 is set higher i1 must be correspondingly increased. In this example if T1 is 5, i1 must be $12.5*10^7$.

Counter 2 (54) establishes the repeatability of the relationship between Counter 1 (48) and Symbol Counter 56. Counter 2 (54) increments whenever Counter 1 (48) meets T1 errors at i1 symbols. It is reset to 0 if Counter 1 is less than T1 at i1 symbols. The threshold T2 is somewhat arbitrary. If Counter 2 increments to T2 counts the error monitor has detected that the error rate consistently maintains the error rate threshold. If Counter 2 (54) cannot get to T2, there is a reasonable chance that the error is bursty and does not represent the designated error rate.

Once link is established at 100 Mb/s, the symbol Counter 56 continuously increments for every detected symbol in step 64 and resets itself every i1 symbols in step 72. The error monitor 46 monitors the symbol errors in step 66, for interval $i_1$ symbols. Counter 1 (48) increments in step 68 for every error detected. When the Symbol Counter equals i1 in step 70, counter 1 is checked in step 72 to see if the error count has exceeded the threshold. If counter 1 has not exceeded the threshold all the counters are reset in step 74. If Counter 1 equals or exceeds the threshold, Counter 2 is incremented in step 76. In either case counter 1 is reset and the Symbol counter 56 (i.e. internal counter) is reset.

If Counter 2 is incremented, Counter 2 is checked in step 78 to see if it has exceeded threshold T2. If T2 is exceeded, the link is broken and reestablished at 10 Mb/s in step 80. This can be done by either forcing the data rate to 10 Mb/s or by setting the 100BASE-TX bits in Register 4 (Bit 8 and Bit 7) to 0 before restarting auto-negotiation.

Once the link has been reestablished at 10 Mb/s, it will remain there until it is broken via outside intervention. It could be because the Link Partner breaks the link, the cable is disconnected, management restarts auto-negotiation, management disables auto-negotiation, or any number of other things that could cause the link to break. Once the link is broken and auto-negotiation is enabled, the link is reestablished at 100 Mb/s. All the counters are reset and the error monitor continues checking for symbol errors.

According to the disclosed embodiment, 100 Mb/s data bits can be easily monitored to determine whether link integrity is not performing to required specifications, for example, due to bad cable or poorly-performing hardware circuitry, etc. The disclosed arrangement minimizes the requirements for the network manager 40 to continually monitor the link status for each of the network ports. Moreover, the link controller, upon detecting the symbol error rate reaching a prescribed threshold, effectively downshifts the corresponding repeater port by breaking the link and establishing a new link at the reduced data rate.

Although the disclosed arrangement describes a single link controller 34 serving each of the repeater ports 14, and link controller 34 may alternately be implemented in each of the repeater ports 14, such that each repeater port 14 is capable of independently monitoring and controlling its own link based on detected symbol error rates. Alternatively, the symbol error detectors, counters, and timers may be centrally located with the link controller 34 to provide a more centralized architecture.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network repeater, comprising:
   establishing a link with a remote network node at a prescribed data rate via a network medium; and
   determining an integrity of the link by:
   (1) counting in a first counter a detected number of symbol errors within a first interval,
   (2) incrementing a second counter if the detected number of symbol errors exceeds a first threshold within the first interval, and
   (3) determining if the second counter reaches a second threshold within a second interval including a successive plurality of the first intervals, the link integrity based on the second counter reaching the second threshold within the second interval.

2. The method of claim 1, wherein the first interval corresponds to a first prescribed number of symbols received from the remote network node.

3. The method of claim 2, wherein the second interval corresponds to a second prescribed number of received symbols substantially larger than the first prescribed number of received symbols.

4. The method of claim 3, wherein the counting step includes resetting the first counter upon reaching the first prescribed number of received symbols.

5. The method of claim 4, wherein the incrementing step includes resetting the second counter if the first counter does not reach the first threshold upon reaching the first prescribed number of received symbols.

6. The method of claim 4, further comprising resetting the second counter upon reaching the second prescribed number of received symbols.

7. The method of claim 1, wherein the first threshold corresponds to a selected significant bit of the detected number of symbol errors, the incrementing step including detecting a transition in the selected significant bit of the detected number of symbol errors.

8. The method of claim 1, wherein the second threshold corresponds to a selected significant bit of the value of the second counter, the incrementing step including detecting a transition in the selected significant bit of the value of the second counter.

9. The method of claim 1, further comprising supplying at least one of the first and second thresholds to the network repeater via a serial interface.

10. The method of claim 1, further comprising generating a signal indicating a problem in the integrity of the link in response to the second counter reaching the second threshold.

11. The method of claim 1, further comprising selectively reducing the data rate on the network medium from the prescribed data rate to a reduced data rate in response to the second counter reaching the second threshold within the second interval.

12. The method of claim 1, wherein the first and second thresholds represent a first symbol error rate and a second symbol error rate, respectively, the second symbol error rate being substantially less than the first symbol error rate.

13. A network repeater having a plurality of repeater ports configured for sending and receiving data packets between remote network nodes via respective network media, the network repeater comprising:
   a first repeater core configured for sending and receiving data packets between a first group of the repeater ports according to a first data rate;
   a second repeater core configured for sending and receiving data packets between a second group of the repeater ports according to a second data rate slower than the first data rate;
   an auto-negotiation unit configured for selecting one of the first and second data rates for establishment of links between the repeater ports and the respective remote network nodes via the respective network media;
   a symbol error detector for detecting a number of symbol errors on at least one of the links operating at the first data rate, the symbol error detector comprising:
      (1) a first counter for counting a detected number of symbol errors within a first interval, and
      (2) a second counter for counting, within a second interval larger than the first interval, a number of the first intervals having the detected number of symbol errors exceeding a first prescribed threshold; and
   a controller for detecting an integrity of the at least one link based on the counter value of the second counter reaching a second threshold within the second interval.

14. The repeater of claim 13, wherein the controller selectively changes the at least one link from the first data rate to the second data rate based on the value of the second counter reaching the second threshold within the second interval.

15. The network repeater of claim 13, wherein the first and second thresholds corresponding to selected significant bits of the first and second counter values, respectively, the second counter being incremented based on a transition in the selected significant bit of the first counter value.

16. The network of claim 13, wherein the first and second intervals correspond to first and second numbers of received symbols, respectively, wherein the first counter is reset at the end of each first interval and the second counter is reset at the end of each second interval.

* * * * *

UNITED STATES PATENT AND TRADEMARK OFFICE
CERTIFICATE OF CORRECTION

PATENT NO. : 6,690,650 B1
DATED : February 10, 2004
INVENTOR(S) : Rudolph Sterner It is certified that error appears in the above-identified patent and that said Letters Patent is hereby corrected as shown below:

<u>Title page,</u>
Item [75], Inventor, change "Stener" to -- Sterner --

Signed and Sealed this

Tenth Day of August, 2004

JON W. DUDAS
*Acting Director of the United States Patent and Trademark Office*